April 10, 1951 D. C. HARVEY 2,548,529
CAMERA PART LATCHING AND GUIDING CONSTRUCTION
Filed Jan. 29, 1948
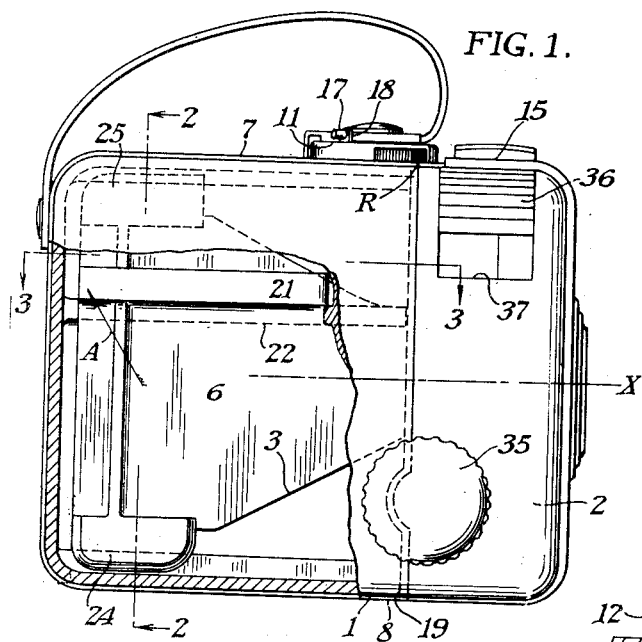
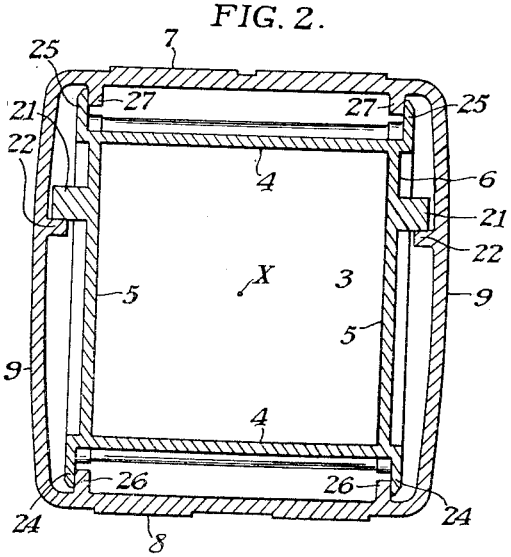
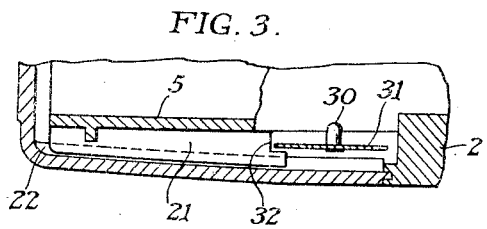
DOUGLASS C. HARVEY
INVENTOR
BY
ATTORNEYS Patented Apr. 10, 1951

2,548,529

UNITED STATES PATENT OFFICE 2,548,529

CAMERA PART LATCHING AND GUIDING CONSTRUCTION

Douglass C. Harvey, Rochester, N. Y., assignor to Eastman Kodak Company, Rochester, N. Y., a corporation of New Jersey Application January 29, 1948, Serial No. 5,167

4 Claims. (Cl. 95—11)

This invention relates to a camera part latching and guiding construction. One object of my invention is to provide a camera of the box type with a single latch on one wall which will hold the camera parts together in light-tight relationship. Another object of my invention is to provide a camera part construction so arranged that portions of the parts coact to assist the single latch in holding the parts together and to permit the camera parts to be readily guided into their operative position in which they may be held by the latch construction. Other objects will appear from the following specification, the novel features being particularly pointed out in the claims at the end thereof.

Coming now to the drawings wherein like reference characters denote like parts throughout.

Figure 1 is a side elevation partially in section showing the camera with a latching mechanism constructed in accordance with and embodying a preferred form of my invention.

Figure 2 is a sectional view taken through the camera shown in Figure 1 on line 2—2 thereof.

Figure 3 is a fragmentary detail section taken on line 3—3 of Figure 1.

Figure 4 is an enlarged fragmentary top plane view shown partially in section and illustrating the latch elements in their latched position.

Figure 5 is a transverse section through the latching mechanism shown in Figures 1 and 4.

Figure 6 is an enlarged top plane view of the latch shown in Figure 1, the latch being shown in a closed or operative position.

In cameras of the box type, it is customary to make the camera of two parts which may be moved one relative to the other for loading the film in the camera. Such box cameras are ordinarily provided with two latch members because it has, in the past, been difficult to provide a single latch in such a manner that all four sides of the interengaging camera parts would be held tightly together to maintain a light lock between the parts. My present invention is particularly directed to overcoming these difficulties.

Referring to Figure 1, the camera designated broadly as "1" may be made in two parts; a front part 2 carrying a rearwardly extending cone-like member 3, this cone having slanting top and bottom walls 4 and having parallel side walls 5 as best shown in Figure 3. The cone is assembled to the front portion 2 so that when the camera is opened, the front portion 2 and the cone are slid axially out of an outer box-like casing, part 6 constituting the second part of the camera. This section 6 includes a top wall 7, a bottom wall 8, and similar side walls 9, as shown in Figure 2. These walls may be curved in cross section, as shown, to form a decorative appearance.

In order to latch the camera parts 2 and 6 together, a simple form of latch, best shown in Figures 4 to 6 inclusive, is employed. On the top wall 7 of camera part 6 there is a stud 10, best shown in Figure 5. This stud passes through a latch member 11 which is a circular disk having a downwardly turned flange 12 extending around the disk, this flange having a notch or cut-away portion 13 designed to admit a lug 14 forming a part of the top wall 15 of the camera part 2. The lug 14 has an arcuate surface 16 which fits the inside of the flange 12. When this flange is turned about the stud 10 as by means of a handle 17 extending upwardly from a lug 18 formed from the metal of the disk 11, the cut-out portion 13 may be brought in alignment with the lug 14 and since the lug 14 is of somewhat less width than the cut-out portion 13, it may pass freely therethrough.

The facing edges of the outer box-like casing 6 and the front section 2 of the camera have a tongue 19 and groove 20 connection extending completely around the facing edges to form a light-tight connection between the two camera parts. If, however, only the latch elements above described were relied upon, that part of the camera lying on a wall opposite to the wall 7 supporting the latch, namely the wall 8, might move in the general direction shown by the arrow A in Figure 1 about the point R, a distance sufficient for light to enter.

In order to prevent this and in order to properly guide the camera parts together in loading and unloading the construction which will now be described is employed. On the parallel walls 5 of the cone 3 there are a pair of rails 21 extending parallel to the axis X of the camera. These rails may engage a second pair of rails 22, these latter rails being carried on the inside of the outer box-like casing 6. When these rails are engaged it will be evident that the outer box-like casing 6 cannot turn in the direction shown by the arrow A in Figure 1 and consequently the tongue 19 and groove 20 connection cannot separate along the bottom edge of wall 8 so that the single pair of latching elements 12—14 will hold the camera parts together.

While the rails 21 and 22 are necessary to hold the two parts of the camera in a latched position, they are also useful in loading and unloading the camera since they enable the two camera parts to be guided, one relative to the other, to and from an operative or closed position.

I also prefer to guide the cone 3 laterally as well as vertically with respect to Figure 2 and, accordingly, the cone 3 may be provided with pairs of rails 24 and 25, one pair being arranged near the edge of the outside walls 9. These rails may, if desired, be made comparatively short, as shown in Figure 1. They engage pairs of rails 26 and 27 carried near the curved walls 9 on the top wall 7 and the bottom wall 8 of the outer box-like casing. Consequently, the engagement of these pairs of rails all of which are preferably made parallel to the axis X of the camera, guide the cone 3 with its attached front part 2 accurately into the outer box-like casing so that this casing member may telescope the cone member 3 until the tongue 19 and the groove 20 connections are brought into a light-tight relationship.

The cone 3 may have the usual spool supporting members such as the spool centering pin 30 carried by a known type of spring plate 31 and, if desired, the rail 21 may be provided with a notch 32 for limiting the outward movement of the spring arm 31.

The front camera section 2 may be provided with the usual winding knob 35 and there may also be a trigger member 36 operating in a slot 37 in the camera wall.

My improved form of latching and guiding construction for camera parts is extremely simple and may be operated as follows:

With the camera closed, as in Figure 1, the handle 17 may be rotated by moving it to the right with respect to Figure 1, thereby moving the cut-out area 13 of the flange 12 of latch element 11 opposite the lug 14. A slight pull on the camera part 2 will remove this part with its attached cone 3 from the part 6 which is the outer box-like telescoping casing section. This movement is in an axial direction, that is, it is along the axis X of the camera casing and the movement of the parts is guided by means of the pairs of rails 21 and 22 and the pairs of rails 24, 25, 26 and 27. After the film has been loaded in the cone section in a known manner, the camera may be closed by engaging the rails and particularly the rails 21 and 22 sliding the camera parts together and into telescoping relationship. During this movement, the camera parts will move axially with respect to each other until the flange 19 and groove 20 are completely engaged at which time the latching lug 14 of the camera section 2 will pass through the aperture 13 in the flange 12. By turning the handle 17 the flange 12 will rotate past the arcuate surface 16 of the lug 14 and the camera parts will be held tightly together. The rails 21 and 22 obviously prevent any rotatable movement of the outer box-like casing about the point R and in the direction of the arrow A so that the tongue 19 remains in the groove 20 and the two camera parts remain light-tight.

I claim:

1. A latching and guiding construction for camera bodies including two relatively movable telescopic parts, a front part including an outer front wall, and part outer top, bottom and side walls, said front part carrying an inner rearwardly extending member comprising four walls lying closer together than the part top, bottom and side walls of the front member, a rear part comprising a box-like member including a rear wall, and top, bottom, and side walls adapted to register with the part top, bottom and side walls of the front member, said rear member having light-tight interengaging walls for engaging complementary shaped walls of the front member and having a telescoping relationship with the walls of the inner rearwardly extending member carried by the front part and being slidable longitudinally thereof for loading and unloading film in the camera, and means for holding the light-tight interengaging complemental shaped walls between the two relatively movable parts in light-tight relationship comprising interengaging pairs of rails extending longitudinally of the front and rear members, the rails on the inner member extending rearwardly from the front member and positioned to slidably engage rails carried by the rear member to prevent lateral movement between the front and rear members, and pairs of slidably engaging rails extending inwardly from the rear section and outwardly from the inner member of the front part to prevent lateral movement of the rear section relative to the front section between the top and bottom walls of the front and rear camera parts, and a latch on the adjacent edges of coacting walls of the front and rear camera parts for holding the front and rear camera parts together while said front and rear camera parts are retained with the top, bottom and side walls of the front and rear parts in alignment and with the light-tight interengaging complemental shaped walls between the parts in engagement.

2. The latching and guiding construction for camera bodies defined in claim 1 characterized by the latch elements comprising a pivotally mounted notched flanged disk carried by one part, and a lug having an arcuate wall carried by the other part adapted to pass through the notch and to be held therein by turning the notched flanged disk upon its pivot.

3. The latching and guiding construction for camera bodies defined in claim 1 characterized in that two pairs of interengaging rails for guiding and positioning the second part relatively to the first part are carried on the top and bottom walls of the first and second parts, and one pair of interengaging rails are carried on each of the side walls of the front and back parts.

4. The latching and guiding construction for camera bodies defined in claim 1 characterized in that two pairs of interengaging rails for guiding and positioning the second part relatively to the first part are carried on the top and bottom walls of the front and back parts, and one pair of interengaging rails are carried on each of the side walls of the front and back parts, the rails extending inwardly from the rear member to engage the rails extending outwardly from the inner member carried by the front member and being located so that each pair of rails may engage on one side of the opposite rail.

DOUGLASS C. HARVEY.

REFERENCES CITED

The following references are of record in the file of this patent:

UNITED STATES PATENTS

| Number | Name | Date |
|---|---|---|
| 579,949 | Brownell | Apr. 6, 1897 |
| 594,368 | Ames et al. | Nov. 30, 1897 |
| 788,307 | Dorr | Apr. 25, 1905 |
| 1,973,479 | Green et al. | Sept. 11, 1934 |
| 2,000,588 | Fuerst | May 7, 1935 |
| 2,292,218 | Drotning et al. | Aug. 4, 1942 |
| 2,396,869 | McDonald Jr. et al. | Mar. 19, 1946 |